US009118872B1

(12) United States Patent
Goodman et al.

(10) Patent No.: US 9,118,872 B1
(45) Date of Patent: Aug. 25, 2015

(54) METHODS AND APPARATUSES FOR IMAGE ENHANCEMENT

(71) Applicant: Raytheon Company, Waltham, MA (US)

(72) Inventors: Vernon R. Goodman, Rockwall, TX (US); Rebekah Montgomery, Dallas, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/340,724

(22) Filed: Jul. 25, 2014

(51) Int. Cl.
*G06K 9/40* (2006.01)
*H04N 1/58* (2006.01)
*G06T 5/40* (2006.01)

(52) U.S. Cl.
CPC ... *H04N 1/58* (2013.01); *G06T 5/40* (2013.01)

(58) Field of Classification Search
USPC .......... 382/254, 266, 276, 277, 169; 280/272, 280/273, 735; 345/428; 348/68, 294, 222.1, 348/E17.001, E5.058; 370/334, 338, 464; 341/118, 144; 375/240.12, 190
See application file for complete search history.

(56) References Cited

U.S. PATENT DOCUMENTS

| 7,760,805 B2 * | 7/2010 | Owens ................. 375/240.12 |
| 8,830,340 B2 * | 9/2014 | Burt et al. .................. 348/222.1 |
| 8,860,793 B2 * | 10/2014 | Lo et al. .......................... 348/68 |

\* cited by examiner

*Primary Examiner* — Anh Do
(74) *Attorney, Agent, or Firm* — Schwegman Lundberg & Woessner, P.A.

(57) ABSTRACT

Embodiments of a method and apparatus for image enhancement are generally described herein. In some embodiments, the method includes accessing two or more sets of first pixel data representative of two or more images of a physical object. The method can further include transforming the two or more sets of pixel data to generate two or more sets of frequency domain data. The method can further include upsampling each of the two or more sets of frequency domain data to generate a set of upsampled frequency domain data. The method can further include re-transforming the set of upsampled frequency domain data to generate two or more sets of second pixel data. The method can further include combining two or more sets of second pixel data to generate an enhanced image of the physical object. Other example methods, systems, and apparatuses are described.

20 Claims, 6 Drawing Sheets

METHODS AND APPARATUSES FOR IMAGE ENHANCEMENT

TECHNICAL FIELD

Some embodiments relate to image compression and restoration. Some embodiments relate to methods for enhancing images for improving usability of images captured for surveillance applications.

BACKGROUND

Images acquired by cameras or other imaging systems are often viewed using a variety of visioning systems specific to various applications such as image surveillance, medical imaging, and other uses. Such applications may require that image data first be enhanced, so that low-level features in the image data can be detected. Available methods for performing such image enhancement are computationally expensive.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
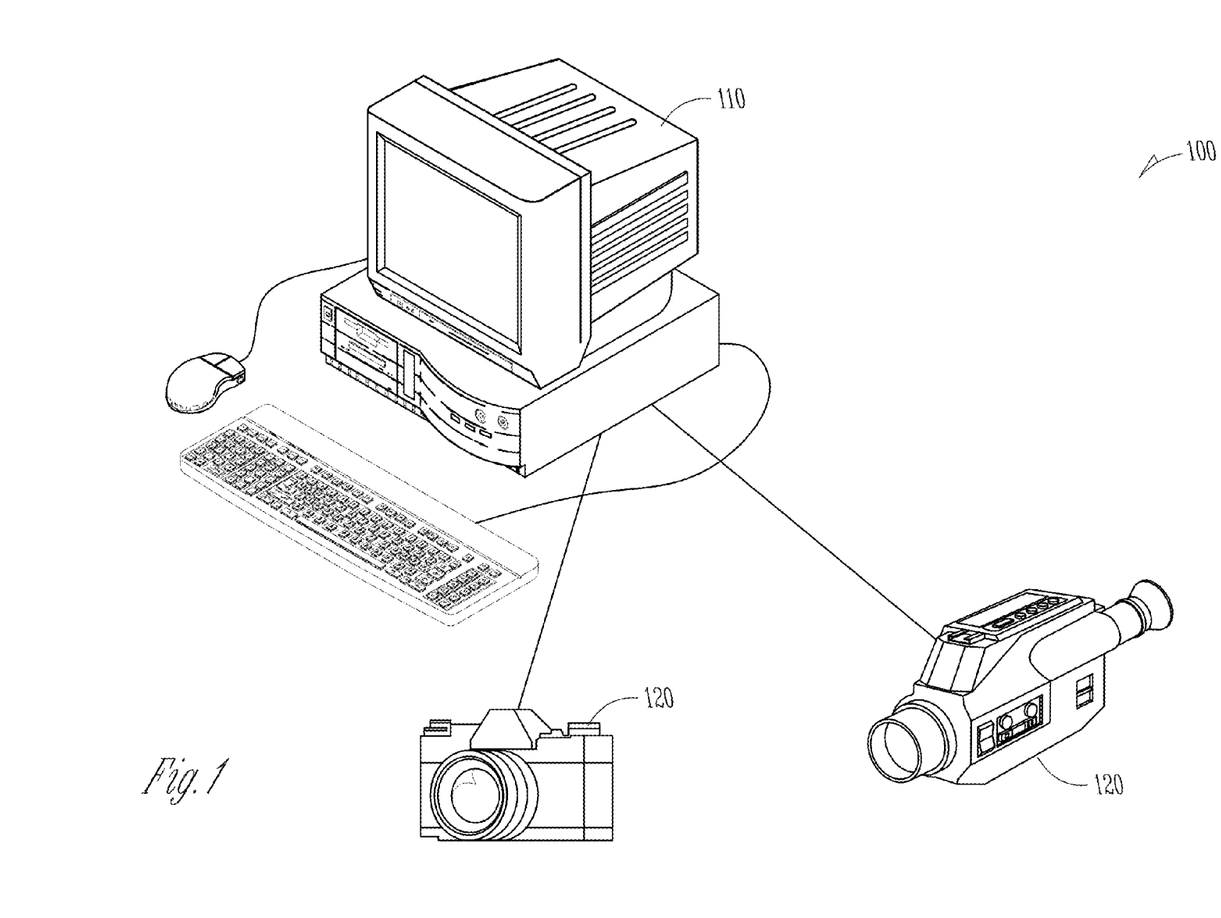
FIG. 1 is a system in which example embodiments may be implemented.

FIG. 1 is a system 100 in which example embodiments may be implemented. The system 100 includes a computing system 110. The computing system 110 can receive pixel data from one or more image capturing modalities such as a surveillance camera 120, or other type of camera or imaging apparatus or a network of cameras or other computer systems or storage devices. The pixel data will be representative of an image, and can include a number of pixels. The pixel data will be represented in a first domain, for example the pixel domain, and the pixel data will have an array dimension corresponding to the number of pixels.

Currently, image upsampling and enhancement methods use wavelet-based techniques or pixel domain techniques to replicate pixels and convolution kernels for image smoothing. Such currently-available systems can be computationally expensive.

In example embodiments, frequency domain techniques are used to replace at least some pixel domain techniques. For example, rather than using large, sliding convolution kernels for smoothing after up-sampling, example embodiments provide upsampling and filtering in the frequency domain. Furthermore, some image enhancement algorithms, when performed in the frequency domain, can provide sharper edge detection than equivalent pixel-domain techniques.

Figure 2:
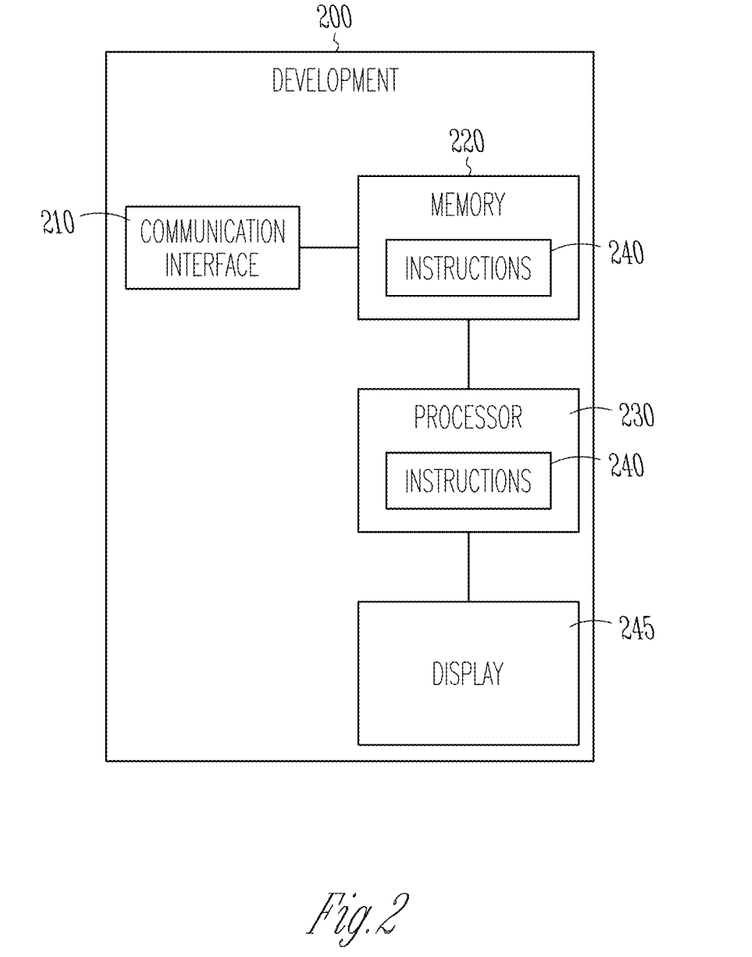
FIG. 2 is a block diagram of a system for implementing procedures in accordance with some embodiments.

FIG. 2 is a block diagram of a computer 200 for implementing methods according to example embodiments. The computer 200 may be appropriate for performing the functionalities of the computer system 100 (FIG. 1).

The computer 200 will include a communication interface 210. The communication interface 210 will retrieve pixel data from image capturing modalities or image storing systems (e.g., cameras 130 of FIG. 1). The pixel data will represent images and the pixel data will include a number of pixels. The pixel data can be initially represented in the pixel domain. The pixel data can include an array with array dimensions corresponding to the number of pixels in the image data.

The computer 200 includes at least one processor 230. The processor 230 can refine edges in the pixel data to generate edge-enhanced image data. The processor 230 can transform the edge-enhanced image data from into a second domain such as the frequency domain. The processor 230 can upsample the transformed image data based on an upsampling ratio to generate upsampled data, using algorithms or other methodologies described in further detail below. The processor 230 will transform the upsampled data back into the pixel domain to generate second pixel data. The second pixel data can have larger array dimensions than did the original pixel data described earlier, wherein the larger array dimensions correspond to the upsampling ratio that was applied to the frequency domain image data.

The computer 200 further includes a user display 345 to display representations of one or more of the original pixel data, the edge-enhanced image data, the second pixel data, or any other graphical information related to or unrelated to the images.

In some embodiments, the processor 230 will perform edge detection is in the frequency domain without necessarily using high pass filtering or other filtering. The processor 230 can apply image compression and restoration to allow operators to storage images in memory 220 or other memory at lower resolution with lower memory usage requirements, and expand images to a higher resolution for viewing. Operators can adjust parameters for contrast stretching by the processor 230 based on the type of image product that operators wish to generate for different applications, or intensities can be automatically adjusted in some embodiments to allow users to see finer detail in some images without requiring users to spend time performing manual adjustments.

Embodiments provide increased accuracy for image-to-image registration, through use of upsampling and edge enhancement in frequency-domain data. Registration techniques in accordance with some embodiments replace computationally-expensive image cross-correlation algorithms with faster and less complex algorithms that register the images together and add the images. Embodiments can be used for sub-pixel recovery to provide higher resolution than is currently available for such applications as forensics and hyperspectral anomaly detection, license-plate reading applications for law enforcement, hyperspectral signatures, medical applications, etc.

The processor 230 can operate with various color modes including black and white, multi-spectral, four-band color, hyperspectral modes, and other color modes. The processor 230 can perform operations in three or more dimensions to enhance resolution for higher-dimensional imagery using technologies including, for example, LiDAR technologies and Passive 3D for registration with two-dimensional imagery using edge detection and enhancement in the frequency domain. According to examples described below, the processor 230 can detect watermarks hidden within color or black and white data.

Various portions of embodiments can be implemented, concurrently or sequentially, on parallel processors using technologies such as multi-threading capabilities.

In addition to implementing various algorithms on frequency-domain transformations of image data, the processor 230 can implement pixel domain analysis techniques. For example, some embodiments provide histogram clipping to further distinguish different colors, or intensities in the case of black and white images by removing a user-defined percentage of low and high intensity pixels, based on the application for which the images will be used, the brightness or darkness of the images, the conditions under which the images were captured, or other criteria. Embodiments can also stretch intensity values evenly across an intensity range.

Embodiments also provide for a submean algorithm in which the processor 230 refines the edges in the pixel data by subtracting a fraction of a mathematical mean of intensities corresponding to the pixel data from pixel values of the pixel data. The processor 230 can apply a submean ratio in accordance with the submean algorithm, such that the processor 230 subtracts percentage of the mean from pixel values, where use of a smaller percentage will generate softer-edged images, and use of a larger percentage will generate sharper-edged images. The processor 230 will apply submean algorithms before any frequency domain processing, and the processor 230 will apply histogram processing after frequency domain processing.

In various embodiments, the processor 230 can apply high-pass filtering, low pass filtering, or both high pass and low pass filtering (i.e., band-pass filtering), in addition to or instead of upsampling, in the frequency domain using algorithms that take advantage of the property of conjugate symmetry. The processor 230 can use low-pass filtering to remove noise from frequency domain data, and the processor 230 can use high-pass filtering to perform edge detection.

In embodiments, the processor 230 implements upsampling algorithms to perform upsampling in the frequency domain by inserting zeroes into the frequency domain data representative of the image, based on a value which can be provided by a user or operator or retrieved from configuration files or other storage. The processor 230 can apply contrast stretching by removing a specified amount of information at the end and beginning of intensity bins in the pixel domain.

Embodiments can apply weighted filtering to upsampled image data, or to filtered image data. Input parameters for weighted filtering can include whether to apply filters to the output only or whether to combine the output of the filter with the original image data, where parameters can further specify how much of the original image, as a percentage, is to be retained versus how much of the filtered image should be used. Embodiments can add the original upsampled image to edge-detected, filtered images in various weights and combinations to emphasize either edges, or detailed portions of the images.

Algorithm input parameters can include parameters specifying whether color or black and white processing should be performed. Input parameters can include an upsample ratio. Input parameters can further include specifications as to whether histogram equalization should be applied, and the amount of data to be removed from the top or the bottom for histogram trimming. For example, analysts may wish to view sharp edges of roads in a surveillance video, while viewing only a minimum of portions of the image between roads. Embodiments therefore, can perform a weighted level of filtering to emphasize edges, while performing less filtering emphasize a portion of an image at the expense of another portion.

Input parameters can define whether to apply low pass filtering, high pass filtering, or both or neither of high pass filtering and low pass filtering. Still further input parameters can define whether to subtract the mean of the pixel intensities, and if so whether only a ratio of the mean should be subtracted.

Table 1 is example pseudocode of an algorithm for frequency domain processing in accordance with some embodiments. The algorithm can be implemented using MATLAB or any other programming language. However, embodiments are not limited to any particular implementation of frequency domain processing.

TABLE 1

Pseudocode for image enhancement in the frequency domain.

```
 1: Function UPSAMPLE(image, upsampleratio, submeanratio,
 2:      lowpassratio, hipassratio)
 3: if submeanratio > 0.0
 4:    image = image − submeanratio*(mean of pixel intensities)
 5: Fxy = fft(image)
 6: upFxy = split the Fxy into 4 equal quadrants and place at the
 7: corners of the upsampled FFT, placing 0's in the unfilled parts
 8: of the upsampled FFT
 9: if (lowpassratio < 1.0)
10:    upFxy =convolve(upFxy,
11: lowwpass2Dwindow(lowpassratio*Nyquist/2)
12: endif
13: if (hipassratio > 0.0)
14: upFxy =
15: convolve(upFxy,hipass2Dwindow(hipassratio*Nyquist/2)
16: upimage = ifft(upFxy)
17: return (upimage)
```

At lines 1-3, input parameters, including the input image data, upsampling ratios, low pass and high pass filter parameters, and other parameters as described earlier herein, are passed to the algorithm. In lines 3-4, if specified by input parameters to the algorithm, the processor 230 subtracts a specified ratio of mean pixel values from the image data. In line 5, the processor 230 performs a Fast Fourier Transform (PIT) on the input pixel data to generate frequency domain image data. In line 6, the processor 230 performs upsampling on the frequency domain data. This can be accomplished by splitting the upsampled frequency domain image data into four equal or nearly equal quadrants, and then placing values of zero in the unfilled portions of the upsampled frequency domain image data. It will be noted that the size of the upsampled frequency domain array is the product of the original image size and the upsampling ratio input parameter. Next, at lines 9-15, the processor 230 can perform high pass filtering, low pass filtering, or both, on the frequency domain data. Finally, at lines 16-17, the processor 230 transforms the frequency domain data back to the pixel domain, after the processor 230 has performed any requested filtering, upsampling, etc. in accordance with input parameters, and the processor 230 passes this processed pixel domain data back to other algorithms for display or further processing.

In some embodiments, the processor 230 performs image processing only in the pixel domain, for example the processor 230 may not apply frequency domain upsampling and filtering of frequency domain data, or the processor 230 can perform pixel domain image processing in addition to frequency domain processing. In some examples, pixel domain processing can include performing contrast histogram techniques on pixel domain data. An example algorithm for contrast histogram techniques is shown in the pseudocode of Table 2, below. However, it will be understood that the processor 230 can implement these or other algorithms in other manners besides those shown in Table 2, and these or other algorithms can be implemented with MATLAB or any other programming language:

TABLE 2

Pseudocode for pixel domain contrast enhancement.

1: Function contrast_hist(image, sperc)
2: Histo = build a histogram of the intensities in the image
3: Histotop = highest intensity < the highest sperc% of intensities
4: in Histo
5: Histobot = lowest intensity > the lowest sperc% of intensities in
6: Histo
7: Set all intensities in image > Histotop to Histotop
8: Set all intensities in image < Histobot to Histobot
9: Return (image)

In line 1, the image is passed to the algorithm, along with a parameter to specify the intensity level at which pixel data is to be removed. At line 2, a histogram plot is created. At lines 3-6, the processor 230 calculates the highest and lowest percentage intensities based on the input intensity level. At lines 7-9, the pixel values are examined to find those with values that are above the maximum threshold or below the minimum threshold, and the values are re-set to the appropriate upper or lower threshold if the values are found to be above or below the corresponding threshold, and the processor 230 passes back the enhanced image for further processing.

Figure 3:
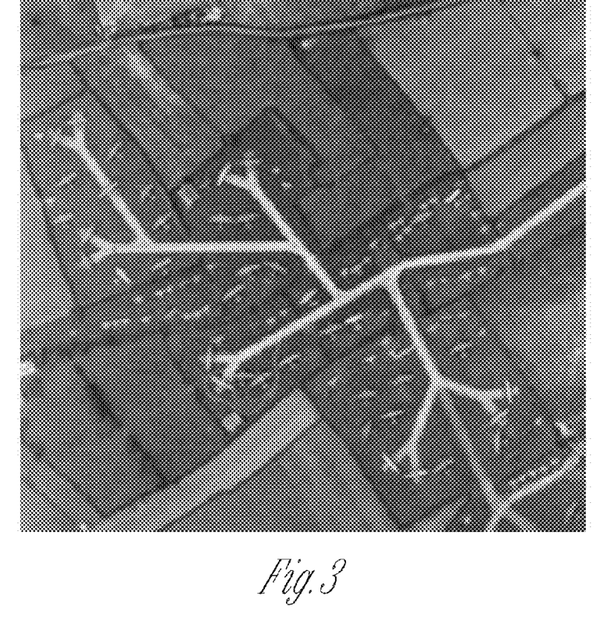
FIG. 3 is a an example image before image enhancement has been performed in accordance with some embodiments.
Figure 4:
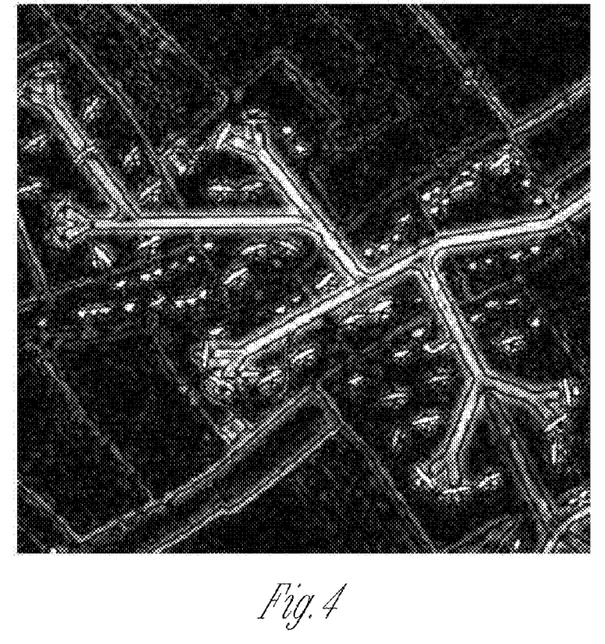
FIG. 4 is an example image after image enhancement has been performed in accordance with some embodiments.

FIG. 3 is an example input image and FIG. 4 is the example input image after the processor 230 has applied various frequency domain and pixel domain image processing techniques. In FIG. 4, the processor 230 has applied upsampling to improve pixilation of the example input image, and the processor 230 has performed high-pass filtering to detect edges. In some examples, the upsampling and high-pass filtering can be performed by executable code similar to that described above regarding Table 1, although embodiments are not limited thereto. Further in FIG. 4, the processor 230 has applied histogram contrast enhancement. The processor 230 can perform contrast enhancement by executing code similar to that described above regarding Table 2, although embodiments are not limited thereto. The edge detected image can be added to the original example input image of FIG. 3 in accordance with a weighted filter as described earlier herein to generate the enhanced image of FIG. 4.

Figure 5:
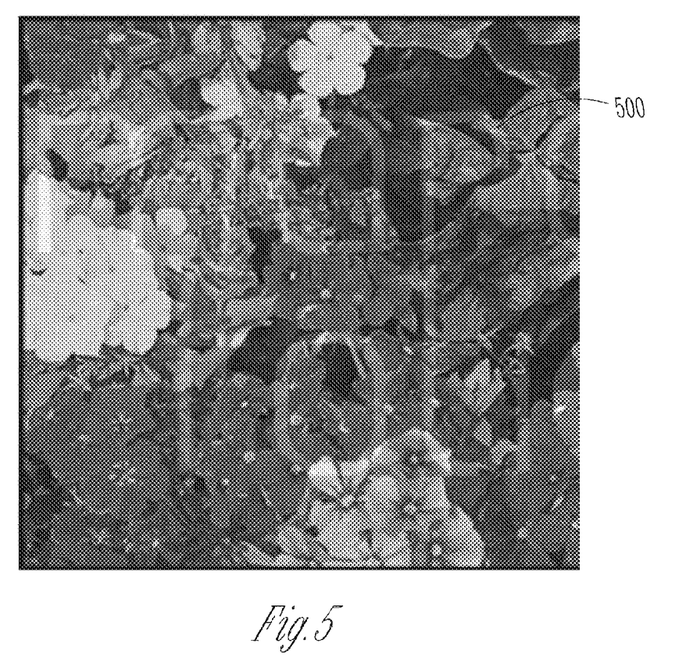
FIG. 5 is an example image before watermark detection has been performed in accordance with some embodiments.
Figure 6:
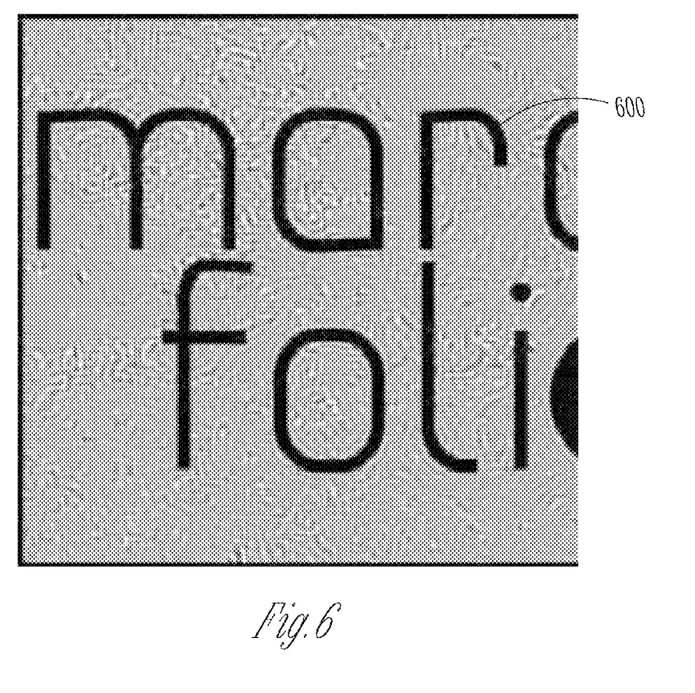
FIG. 6 is an example image after watermark detection has been performed in accordance with some embodiments.

In some embodiments, the processor 230 can perform watermark detection in color images, by removing color, and then performing high-pass or other filtering in the frequency domain, and histogram contrast enhancement in the pixel domain to detect watermark text. For example, FIG. 5 illustrates a color photograph with watermark 600 data. In FIG. 6, the color photograph data has been converted to black and white, and contrast enhancement and edge detection has been applied to enhance watermark 600.

Figure 7:
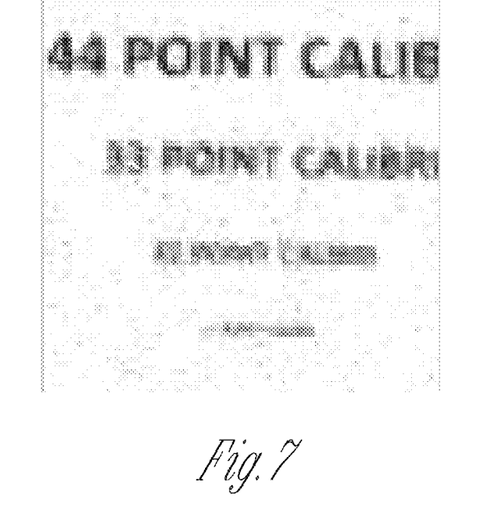
FIG. 7 is an example image before a super resolution algorithm has been implemented.
Figure 8:
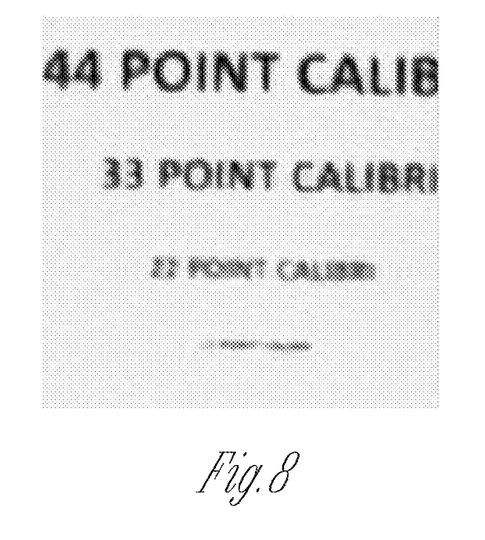
FIG. 8 is an example image after a super resolution algorithm has been implemented.

In some embodiments, the processor 230 receives multiple images of one physical object, and the processor 230 performs upsampling or other processing on each image before combining the images to provide a higher-resolution image of the physical object. For example, FIG. 7 is an example input image for purposes of illustration, and FIG. 8 is the example input image after the processor 230 has performed up-sampling and edge detection of ten images of the object and then combined the ten enhanced images into a single super resolution image. In examples, resolution can be enhanced by up to an order of magnitude.

Referring again to FIG. 2, the computer 200 includes memory 220. In one embodiment, the memory 220 includes, but is not limited to, random access memory (RAM), dynamic RAM (DRAM), static RAM (SRAM), synchronous DRAM (SDRAM), double data rate (DDR) SDRAM (DDR-SDRAM), or any device capable of supporting high-speed buffering of data.

The computer 200 can include computer instructions 240 that, when implemented on the computer 200, cause the computer 200 to implement functionality in accordance with example embodiments. The instructions 240 can be stored on a computer-readable storage device, which can be read and executed by at least one processor 230 to perform the operations described herein. In some embodiments, the instructions 240 are stored on the processor 230 or the memory 220 such that the processor 230 or the memory 220 act as computer-readable media. A computer-readable storage device can include any non-transitory mechanism for storing information in a form readable by a machine (e.g., a computer). For example, a computer-readable storage device can include ROM, RAM, magnetic disk storage media, optical storage media, flash-memory devices, and other storage devices and media.

The instructions 240 can, when executed on the computer 200, cause the computer 200 to access pixel data representative of an image as described earlier herein. The pixel data can include a number of pixels and the pixel data can be represented in a pixel domain. The pixel data can have a first array dimension corresponding to the number of pixels. The instructions can cause the computer 200 to refine edges in the pixel data to generate edge-enhanced image data by subtracting a fraction of a mathematical mean of intensities corresponding to the pixel data from pixel values of the pixel data. The instructions 240 can cause the computer 200 to transform the edge-enhanced image data to the frequency domain to generate transformed image data. The instructions 240 can cause the computer 200 to upsample the transformed image data based on an upsampling ratio to generate upsampled data. The instructions 240 can cause the computer 200 to re-transform the upsampled data back into the pixel domain to generate second pixel data. The second pixel data may have array dimensions larger than the original array dimensions, in accordance with the provided upsampling ratio.

Figure 9:
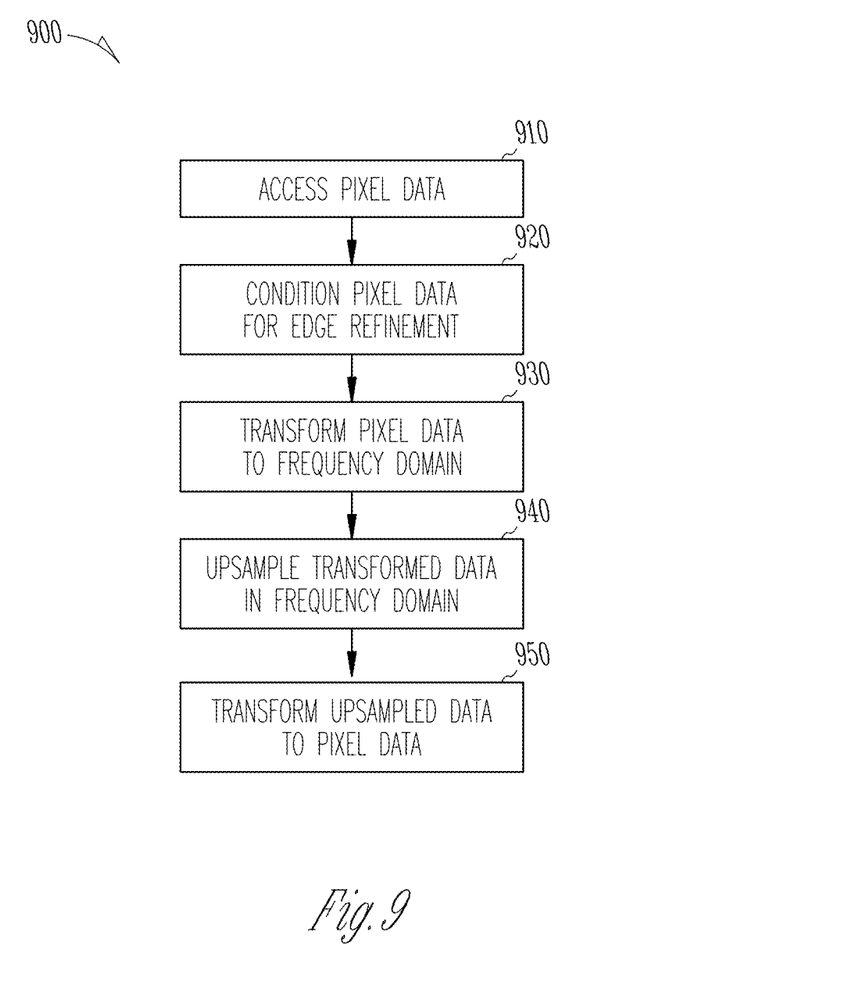
FIG. 9 is a procedure for image enhancement in accordance with some embodiments.

FIG. 9 illustrates a procedure 900 of image enhancement in accordance with some embodiments. The method may be performed by, for example, the processor 230 as described above.

In operation 910, the processor 230 accesses pixel data representative of an image. As described earlier herein, the pixel data includes a number of pixels and the pixel data being is represented in a first domain, typically the pixel domain although embodiments are not limited thereto. The pixel data has a first array dimension corresponding to the number of pixels.

In operation 920, the processor 230 may condition pixel data for edge refinement and generate edge-enhanced image data. Operation 920 may include subtracting a fraction of a mathematical mean of intensities corresponding to the first pixel data from pixel values of the first pixel data In operation 930, the processor 230 transforms the edge-enhanced image data from the first domain into a second domain different from the first domain to generate transformed image data. In embodiments, the second domain is the frequency domain, and the processor 230 transforms data into the frequency domain using a FFT. The original image or the edge-enhanced image data can include a plurality of different spectral bands. In some embodiments, the processor 230 will transform data of at least two of the plurality of different spectral bands to generate at least two color sets of frequency domain data.

In operation 940, the processor 230 upsamples the transformed image data based on an upsampling ratio to generate upsampled data.

In operation 950, the processor 230 transforms the upsampled data back into the first domain to generate second pixel data as described earlier herein. As also described earlier herein, the second pixel data can have array dimensions larger than the dimensions of the original pixel data, according to the selected or provided upsampling ratio.

As described earlier herein, the example method 900 can include, in some alternatives, performance of low pass frequency filtering, high pass frequency filtering, or band pass frequency filtering. This filtering can take place before upsampling operations although embodiments are not limited thereto. The example method 900 can further include contrast stretching, histogram processing, and any other frequency domain or pixel domain image processing technique.

The processor 230 can access a plurality of sets of pixel data representative of a plurality of images of a physical object. The processor 230 can transform the plurality of sets of pixel data to generate a plurality of sets of frequency domain data. The processor 230 can upsample each of the plurality of sets of frequency domain data to generate a set of upsampled frequency domain data. The processor 230 can transform the set of upsampled frequency domain data to a second plurality of sets of pixel data. The processor 230 can combine two or more sets of the second plurality of sets of pixel data to generate an enhanced image of the physical object. The processor 230 can generate image-enhanced images that include the original image and edge-enhancement data, and provide this image-enhanced image to a display.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method of image enhancement, comprising:
   accessing first pixel data representative of a first image, the first pixel data including a number of pixels and the first pixel data being represented in a first domain, the first pixel data having a first array dimension corresponding to the number of pixels;
   conditioning first pixel data for edge refinement to generate edge-enhanced image data;
   transforming the edge-enhanced image data from the first domain into a second domain different from the first domain to generate transformed image data;
   upsampling the transformed image data based on an upsampling ratio to generate upsampled data; and
   transforming the upsampled data into the first domain to generate second pixel data, the second pixel data having a second array dimension greater than the first array dimension, the second array dimension corresponding to the upsampling ratio.

2. The method of claim 1, wherein
   refining the edges in the first pixel data includes subtracting a fraction of a mathematical mean of intensities corresponding to the first pixel data from pixel values of the first pixel data,
   the first domain in the pixel domain and the second domain is the frequency domain, and
   transforming the edge-enhanced image data includes performing a Fast Fourier Transform (FFT) to generate frequency domain data.

3. The method of claim 2, further comprising:
   performing one or more of low pass frequency filtering and high pass frequency filtering on the frequency domain data to generated filtered frequency domain data, and wherein upsampling the transformed image data includes upsampling the filtered frequency domain data.

4. The method of claim 2, further comprising:
   performing at least one of contrast stretching and histogram equalization on the second pixel data, using an intensity parameter representative of a range of pixel intensities to be included in the second pixel data.

5. The method of claim 4, wherein the intensity parameter is selected based on an application for which the second pixel data is to be used.

6. The method of claim 2, wherein the first image is a color image including a plurality of different spectral bands and the method further comprises transforming data of at least two of the plurality of different spectral bands to generate at least two color sets of frequency domain data.

7. The method of claim 2, further comprising:
   accessing a first plurality of sets of pixel data representative of a plurality of images of a physical object;
   transforming the first plurality of sets of pixel data to generate a plurality of sets of frequency domain data;
   upsampling each of the plurality of sets of frequency domain data to generate a set of upsampled frequency domain data;
   transforming the set of upsampled frequency domain data to a second plurality of sets of pixel data; and
   combining two or more sets of the second plurality of sets of pixel data to generate an enhanced image of the physical object.

8. The method of claim 2, further comprising:
   generating a second image that includes the first image and the edge-enhanced image data; and
   displaying the second image.

9. An apparatus for performing image enhancement, the apparatus comprising:
   a communication interface configured to retrieve first pixel data from an image capturing modality, the first pixel data being representative of a first image, the first pixel data including a number of pixels and the first pixel data being represented in a first domain, the first pixel data having a first array dimension corresponding to the number of pixels;
   one or more processors arranged to
      condition first pixel data for edge refinement to generate edge-enhanced image data;
      transform the edge-enhanced image data from the first domain into a second domain different from the first domain to generate transformed image data;
      upsample the transformed image data based on an upsampling ratio to generate upsampled data; and
      transform the upsampled data into the first domain to generate second pixel data, the second pixel data having a second array dimension greater than the first array dimension, the second array dimension corresponding to the upsampling ratio; and a display to display representations of one or more of the first pixel data, the edge-enhanced image data, and the second pixel data.

10. The apparatus of claim 9, wherein the one or more processors are further arranged to:

refine the edges in the first pixel data by subtracting a fraction of a mathematical mean of intensities corresponding to the first pixel data from pixel values of the first pixel data, wherein the first domain in the pixel domain and the second domain is the frequency domain; and transform the edge-enhanced image data by performing a Fast Fourier Transform (FFT) to generate frequency domain data.

11. The apparatus of claim 10, wherein the one or more processors are further arranged to:

perform one or more of low pass frequency filtering and high pass frequency filtering on the frequency domain data to generated filtered frequency domain data; and perform upsampling of the transformed image data by upsampling the filtered frequency domain data.

12. The apparatus of claim 10, wherein the one or more processors are further arranged to:

perform at least one of contrast stretching and histogram equalization on the second pixel data, using an intensity parameter representative of a range of pixel intensities to be included in the second pixel data.

13. The apparatus of claim 12, wherein the one or more processors selects the intensity parameter based on an application for which the second pixel data is to be used.

14. The apparatus of claim 10, wherein the first image is a color image including a plurality of different spectral bands and the one or more processors are further arranged to transform data of at least two of the plurality of different spectral bands to generate at least two color sets of frequency domain data.

15. The apparatus of claim 10, wherein the one or more processors are further arranged to:

access a first plurality of sets of pixel data representative of a plurality of images of a physical object;

transform the first plurality of sets of pixel data to generate a plurality of sets of frequency domain data;

upsample each of the plurality of sets of frequency domain data to generate a set of upsampled frequency domain data;

transform the set of upsampled frequency domain data to a second plurality of sets of pixel data; and combine two or more sets of the second plurality of sets of pixel data to generate an enhanced image of the physical object.

16. The apparatus of claim 10, wherein the one or more processors are further arranged to generate a second image that includes the first image and the edge-enhanced image data, and wherein the display is further arranged to display the second image.

17. A non-transitory computer-readable medium storing instructions that, when executed on an machine, cause the machine to:

access first pixel data representative of a first image, the first pixel data including a number of pixels and the first pixel data being represented in a pixel domain, the first pixel data having a first array dimension corresponding to the number of pixels;

refine edges in the first pixel data to generate edge-enhanced image data by subtracting a fraction of a mathematical mean of intensities corresponding to the first pixel data from pixel values of the first pixel data;

transform the edge-enhanced image data to the frequency domain to generate transformed image data;

upsample the transformed image data based on an upsampling ratio to generate upsampled data; and transform the upsampled data into the first domain to generate second pixel data, the second pixel data having a second array dimension greater than the first array dimension, the second array dimension corresponding to the upsampling ratio.

18. The non-transitory computer-readable medium of claim 17, further comprising instructions that, when implemented on the machine, cause the machine to:

perform one or more of low pass frequency filtering and high pass frequency filtering on the frequency domain data to generated filtered frequency domain data, and wherein upsampling the transformed image data includes upsampling the filtered frequency domain data.

19. The non-transitory computer-readable medium of claim 17, further comprising instructions that, when implemented on the machine, cause the machine to:

access a first plurality of sets of pixel data representative of a plurality of images of a physical object;

transform the first plurality of sets of pixel data to generate a plurality of sets of frequency domain data;

upsample each of the plurality of sets of frequency domain data to generate a set of upsampled frequency domain data;

transform the set of upsampled frequency domain data to a second plurality of sets of pixel data; and combine two or more sets of the second plurality of sets of pixel data to generate an enhanced image of the physical object.

20. The non-transitory computer-readable medium of claim 17, further comprising instructions that, when implemented on the machine, cause the machine to:

generate a second image that includes the first image and the edge-enhanced image data; and display the second image.

* * * * *